United States Patent [19]
Nakasuji et al.

[11] Patent Number: 5,384,579
[45] Date of Patent: Jan. 24, 1995

[54] INFORMATION DISPLAY APPARATUS AND METHOD OF SCROLLING DISPLAYED DATA

[75] Inventors: Masataka Nakasuji; Toshiaki Fujiwara; Chieji Katoh; Shigeru Shindoh, all of Nara, Japan

[73] Assignee: Sharp Kabushiki Kaisha, Osaka, Japan

[21] Appl. No.: 794,327

[22] Filed: Nov. 12, 1991

Related U.S. Application Data

[63] Continuation of Ser. No. 406,097, Sep. 12, 1989, abandoned.

[30] Foreign Application Priority Data

Sep. 26, 1988 [JP] Japan ................................. 63-240482
Sep. 26, 1988 [JP] Japan ................................. 63-240483
Sep. 26, 1988 [JP] Japan ................................. 63-240484

[51] Int. Cl.6 ........................................... G09G 3/36
[52] U.S. Cl. ........................... 345/123; 345/103; 345/212; 364/707
[58] Field of Search ............... 340/721, 723, 724, 726, 340/784, 792; 364/419, 900, 707; 341/22, 26; 358/220; 307/141, 269, 296.3; 345/103, 123, 212

[56] References Cited

U.S. PATENT DOCUMENTS

| | | | |
|---|---|---|---|
| 4,271,404 | 6/1981 | Tanaka | 341/26 |
| 4,338,623 | 7/1982 | Asmus et al. | 358/220 |
| 4,481,607 | 11/1984 | Kobayashi et al. | 364/900 |
| 4,528,560 | 7/1985 | Bergermann et al. | 340/792 |
| 4,679,043 | 7/1987 | Morokawa | 340/784 |
| 4,710,762 | 12/1987 | Yamada | 340/721 |
| 4,811,273 | 3/1989 | Kishimoto | 364/900 |
| 4,825,143 | 4/1989 | Cheng | 307/141 |
| 4,912,462 | 3/1990 | Washizuka et al. | 341/22 |
| 4,912,671 | 3/1990 | Ishida | 364/900 |
| 4,954,956 | 9/1990 | Yamakawa et al. | 364/419 |
| 4,970,502 | 11/1990 | Kunikane et al. | 340/792 |

FOREIGN PATENT DOCUMENTS 59-13281  1/1984  Japan .
63-36294  2/1988  Japan .

OTHER PUBLICATIONS

John T. Eaton et al., "Design of HP's Portable Computer Family", Hewlett–Packard Journal (Jul. 1986), Amstelveen, Netherlands, 37(7):4–13.

Primary Examiner—Richard Hjerpe
Attorney, Agent, or Firm—Morrison & Foerster

[57] ABSTRACT

An information display apparatus having an input unit for entering a variety of data and processing requests, a processing unit, and a display unit for displaying input data and processing results is provided. The display unit displays two or more data groups in separate display areas, and provides scrolling functions to individually scroll each display area in predetermined directions as designated by the input unit. The processing unit includes an automatic power-off function for automatically turning off power to the apparatus if it remains non-operated for a predetermined time period. The processing unit also includes a continuous search function for continuously searching data in a predetermined order, and a search stop device that automatically stops a continuous search after a predetermined amount of search or search time, thereby enabling the automatic power-off function.

28 Claims, 9 Drawing Sheets

INFORMATION DISPLAY APPARATUS AND METHOD OF SCROLLING DISPLAYED DATA

This application is a continuation of application Ser. No. 07/406,097, filed Sep. 12, 1989, now abandoned.

FIELD OF THE INVENTION

The present invention relates to an information display apparatus having a display unit for displaying information and capable of scrolling the information displayed on the display unit, which apparatus is provided with (i) a continuous search function for continuously searching and displaying, in a predetermined order, information concerned as selected from previously stored information with entered information serving as a clue, and (ii) an automatic power-off function for turning the power of the apparatus to OFF if the apparatus remains non-operated for a predetermined period of time.

BACKGROUND OF THE INVENTION

There is known an information display apparatus of the type above-mentioned, for example, a so-called image display apparatus or electronic pocket notebook, adapted to store data entered by operating the input keys and to display the stored data on the display unit. In the apparatus of this type, displayed data as information may be scrolled vertically and transversely, enabling to display a data portion which cannot be displayed at one time on the screen of the display unit.

There is known an image display apparatus of the type above-mentioned as disclosed by Japanese Laid-Open Patent Publication No. 63-36294. This apparatus includes a memory having capacity twice or more one display area of the screen, such that data are displayed as partitioned and supplied by the control means. Accordingly, when displaying, while scrolling vertically, transversely or obliquely, digital information of which amount exceeds one display area, the apparatus is not required to be once stopped for replacing displayed data with data which could not be displayed at one time, thus assuring a continuous and smooth scrolling display.

A display apparatus such as a so-called electronic pocket notebook has a continuous search function for continuously displaying, in a predetermined order, previously stored data concerned according to data entered by operating the input keys. It is now supposed that such apparatus has an English-English dictionary function. In this case, when data of "a" is entered and the key for executing a search processing is operated, there are displayed, on the display unit, data such as "a"→"abandon"→"abbey", one by one, in a predetermined order.

The conventional information display apparatus is arranged such that, when executing the continuous search function, the search processing is continued until all data concerned are displayed. Further, while the key for executing a search processing is pressed, the search is permanently executed. Accordingly, the apparatus is, in a sense, under operation while the search processing is under way. Therefore, the automatic power-off function is not operable. Further, there are instances where the automatic power-off function is not operated even after the search processing has been complete.

If the amount of data concerned is small, there is encountered no problem. However, if there is a great number of data concerned, the search operation is made for a long period of time, resulting in considerable consumption of the electric power. That is, the conventional information display apparatus presents the defect that the specially disposed automatic power-off function does not work effectively.

Further, the conventional information display apparatus is generally arranged such that, for example when scrolling data displayed on the screen, only a divided portion of the displayed data is scrolled and displayed, or the data to be displayed are grouped by screens so that the entire displayed data are scrolled in the same direction. More specifically, there cannot be readily carried out operations, on the same display screen, for transversely scrolling the data on one position and vertically scrolling the data on another position. Accordingly, for example when mutually referring to different data on the same screen, an efficient data display cannot be made, but troublesome operations are required. Thus, the conventional apparatus is not handy in use.

When data of a different plurality of groups are displayed on the display unit and all the data of all the groups cannot be displayed at one time on the screen of the display unit, it is required to display all the data by scrolling the data displayed on the screen. In such a case, the conventional information display apparatus merely has a choice of the following three possibilities:

(i) displayed data of one group only are scrolled;
(ii) displayed data of the respective groups are scrolled in the same direction; or
(iii) data of different groups may be respectively so edited as to be displayed on different screens, and displayed data of each group may be scrolled on each screen.

Accordingly, the data cannot be displayed efficiently and troublesome operations are required. Thus, the conventional apparatus is not handy in use.

SUMMARY OF THE INVENTION

It is an object of the present invention to provide an information display apparatus in which individual scrolling directions are respectively set for a plurality of display areas formed, as divided, on the display unit, and by operating the input unit, displayed data may be readily scrolled in an individual direction for every display area, thus assuring an efficient data display with improved maneuverability.

It is another object of the present invention to provide an information display apparatus in which individual scrolling directions are respectively set for different data groups, and by operating the input unit, displayed data may be readily scrolled in the individual directions, thus assuring an efficient data display with improved maneuverability.

It is a further object of the present invention to provide an information display apparatus in which, even though the amount of data to be searched is considerable, it is prevented that a continuous search operation is executed in vain for a long period of time, thereby to prevent the increase in power consumption.

It is still another object of the present invention to provide a method of scrolling displayed data in an information display apparatus, capable of achieving an efficient data display with good visuality assured.

To achieve the objects above-mentioned, the information display apparatus in accordance with a first embodiment of the present invention comprises:
an input unit for entering a variety of data and for designating a variety of processings;

a display unit for displaying input data and processing results;

a processing unit having (i) a scrolling function for scrolling data displayed on the display unit in an individual direction for every display data or for every displayed data of each of a plurality of groups according to designation made at the input unit, (ii) a continuous search function for continuously searching, in a predetermined order, data concerned with entered data serving as a clue, and (iii) an automatic power-off function for automatically turning the power of the apparatus to OFF if the apparatus remains non-operated for a predetermined period of time; and search stop means adapted to automatically stop a continuous search under way when a predetermined amount of continuous search is finished, thereby to make effective the automatic power-off function.

The information display apparatus in accordance with a second embodiment of the present invention comprises:

a display unit for displaying data;

a plurality of input units for designating the directions in which data displayed on the display unit are to be scrolled; and a processing unit for displaying data with the display unit divided into a plurality of display areas, and for scrolling data displayed on the display areas in an individual direction for every display area according to designation made at each of the input units.

The information display apparatus in accordance with a third embodiment of the present invention comprises:

a display unit for displaying data;

a plurality of input units for designating the directions in which data displayed on the display unit are to be scrolled; and a processing unit for displaying data of a plurality of groups on the display unit and for scrolling data of a plurality of groups displayed on the display unit in an individual direction for every data group according to designation made at each of the input unit.

According to the information display apparatus having the arrangement above-mentioned, the operation of the processing unit causes the display unit to be divided into a first display area and a second display area, and different data are respectively displayed on the display areas. When the input unit for designating the transverse scrolling direction is operated, the displayed data on the first display area may be transversely scrolled. When the input unit for designating the vertical scrolling direction is operated, the data displayed on the second display area may be vertically scrolled. If the data displayed on the first display area originally contain a data portion which cannot be displayed at one time thereon, the input unit for designating the transverse scrolling direction may be operated. This causes the displayed data to be transversely scrolled, so that the data portion above-mentioned may be displayed. If the data displayed on the second display area originally contain a data portion which cannot be displayed at one time thereon, the input unit for designating the vertical scrolling direction may be operated. Thus, the data portion above-mentioned may be displayed thereon.

According to the information display apparatus of the present invention, individual scrolling directions are respectively set for a plurality of display areas formed, as divided, on the display unit. By operating the input units, displayed data may be readily scrolled in an individual direction for every display area. This assures a good maneuverability and an efficient data display.

The information display apparatus in accordance with a fourth embodiment of the present invention comprises:

an input unit for entering a variety of data and for designating a variety of processings;

a display unit for displaying input data and processing results;

a memory unit for storing input data and a variety of information;

a control circuit for controlling all the units above-mentioned; and search stop means adapted to automatically stop a continuous search under way when a predetermined amount of continuous search is finished, thereby to make effective an automatic power-off function by which the power of the apparatus is turned to OFF if the apparatus remains non-operated for a predetermined period of time;

whereby the apparatus is capable of executing a continuous search for continuously displaying, in a predetermined order, data concerned as selected out of previously stored data with entered data serving as a clue.

According to the arrangement above-mentioned, if the amount of data concerned corresponding to input data is considerable, the search processing is stopped after it has been made to a certain extent. Thereafter, the automatic power-off function is made effective. This prevents the continuous search operation to be executed in vain for a long period of time. This prevents the increase in power consumption.

BRIEF DESCRIPTION OF THE DRAWINGS

FIG. 1 to FIG. 9 show an embodiment of the present invention;

FIG. 1 is a flowchart illustrating the operation of an information display apparatus in accordance with the present invention;

FIG. 2 is a front view of the information display apparatus;

FIG. 3 is a schematic perspective view of the information display apparatus;

FIG. 4 is a block diagram illustrating a control unit of the information display apparatus;

FIG. 5 is a block diagram of the arrangement embodying the block diagram shown in FIG. 4;

FIG. 7 is a view illustrating the relationship between a data unit and an index unit in a read-only memory;

FIG. 8 is a flowchart illustrating an automatic power-off operation; and

FIG. 9 is a block diagram illustrating a circuit for the automatic power-off operation.

DESCRIPTION OF THE EMBODIMENTS

The following description will discuss an embodiment of the present invention with reference to FIG. 1 to FIG. 9.

Figure 2:
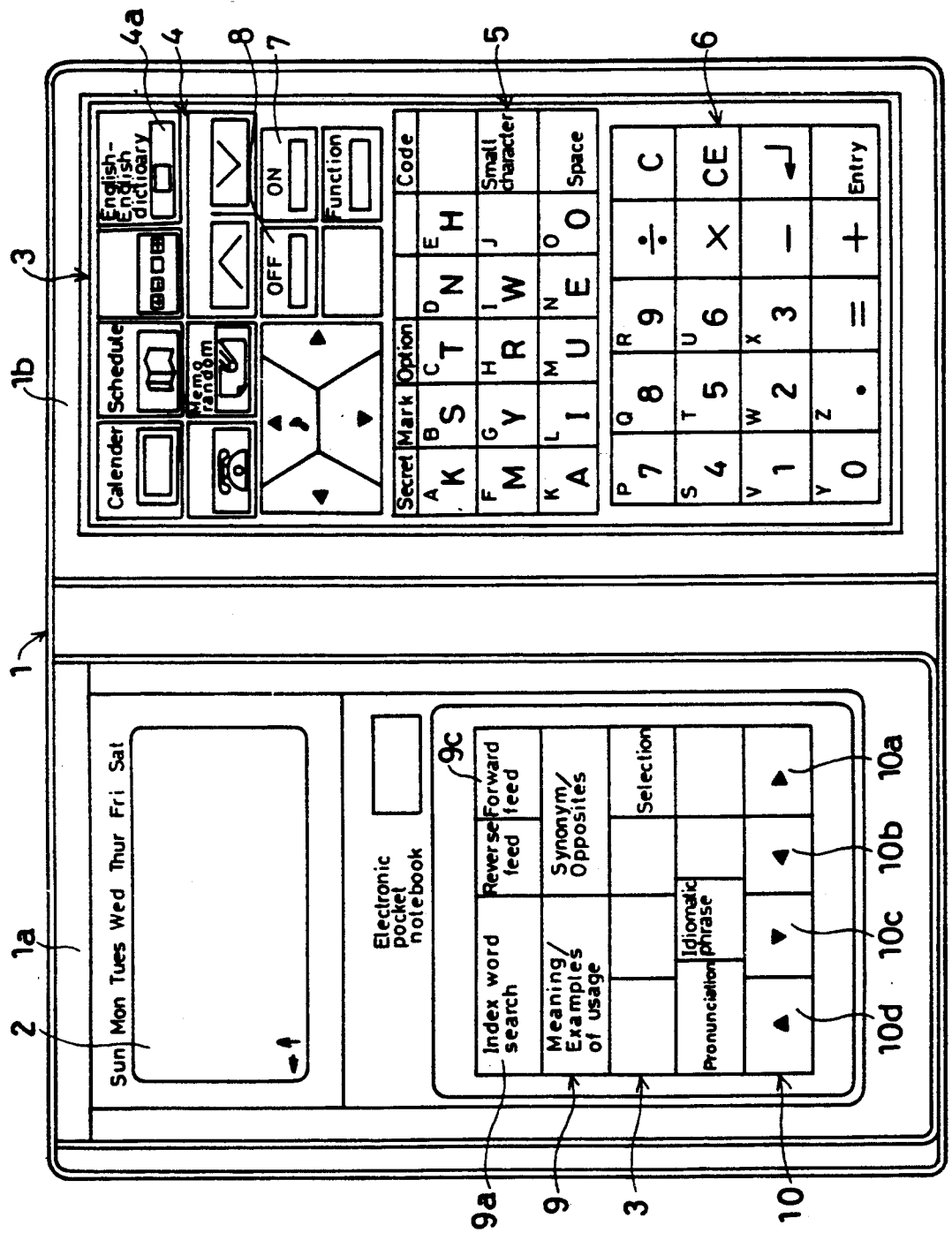
Figure 3:
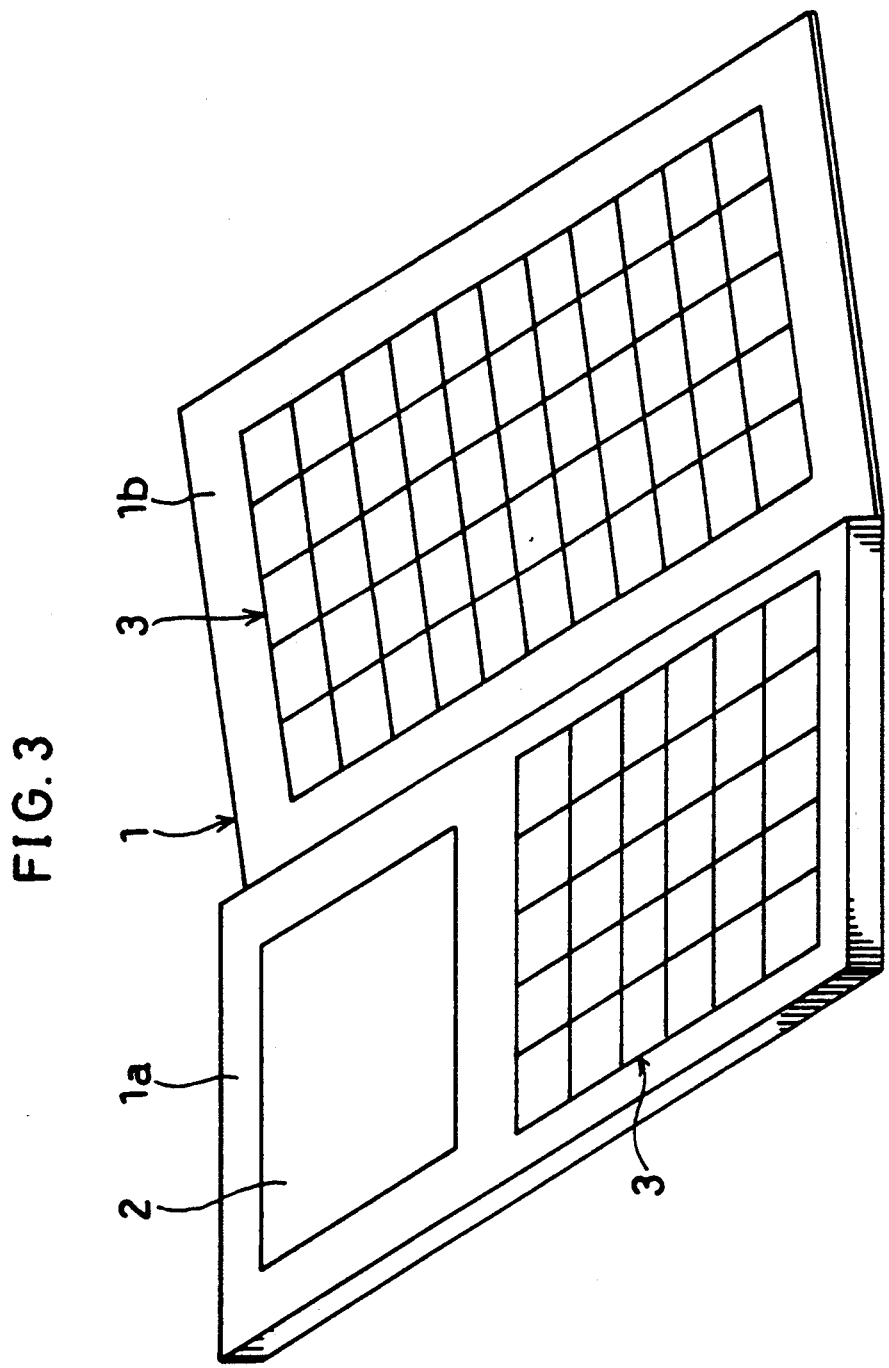

As shown in FIGS. 2 and 3, the information display apparatus in accordance with the present invention has an openable main body 1 in the form of a pocket notebook. The main body 1 has a left-hand portion 1a and a right-hand portion 1b. The left-hand portion 1a is provided at the upper part thereof with a liquid crystal display device 2 (hereinafter referred to as the LCD) serving as a display unit for displaying calculation results or messages as data contents. The LCD 2 is of a dot matrix structure, and is adapted to be divided into an upper-half first display area 2a and a lower-half second display area 2b, to be discussed later. An input key group 3 for entering a variety of information is disposed under the LCD 2 and on the right-hand portion 1b.

In the input key group 3, a mode setting key group 4 for calling and setting a variety of functions of the information display apparatus is disposed at the upper part of the right-hand portion 1b. The mode setting key group 4 includes an English-English dictionary key 4a for setting an English-English dictionary mode, and a variety of keys for respectively setting modes of calender, schedule, calculation, telephone, memo and the like.

Disposed at the center part of the right-hand portion 1b is an alphabet key group 5 for entering character information in alphabets. Disposed at the lower part of the right-hand portion 1b is a numeral input key group 6 for entering numerical information when the apparatus is used as a calculator. A power-ON key 7, a power-OFF key 8 and other keys are disposed between the mode setting key group 4 and the alphabet key group 5. In the apparatus, the English-English dictionary key 4a serves also as the power-ON key 7, and vice versa. More specifically, provision is made such that, for example when the power-ON key 7 is operated, the English-English dictionary mode is executed.

Disposed under the input key group 3 on the left-hand portion 1a is an operation key group 9 including an index word search key 9a for executing a search according to an index word, and other input keys. Disposed under the operation key group 9 is a cursor key group 10 serving as an input unit for scrolling the screen in predetermined directions and for moving the cursor in predetermined directions. The cursor key group 10 includes a right-direction cursor key 10a for moving the cursor rightward, a left-direction cursor key 10b for moving the cursor leftward, an up-direction cursor key 10d for moving the cursor upward, and a down-direction cursor key 10c for moving the cursor downward. In the apparatus, provision is made such that data displayed on the screen are scrolled in the directions opposite to those shown by these cursor keys 10a to 10d.

Figure 4:
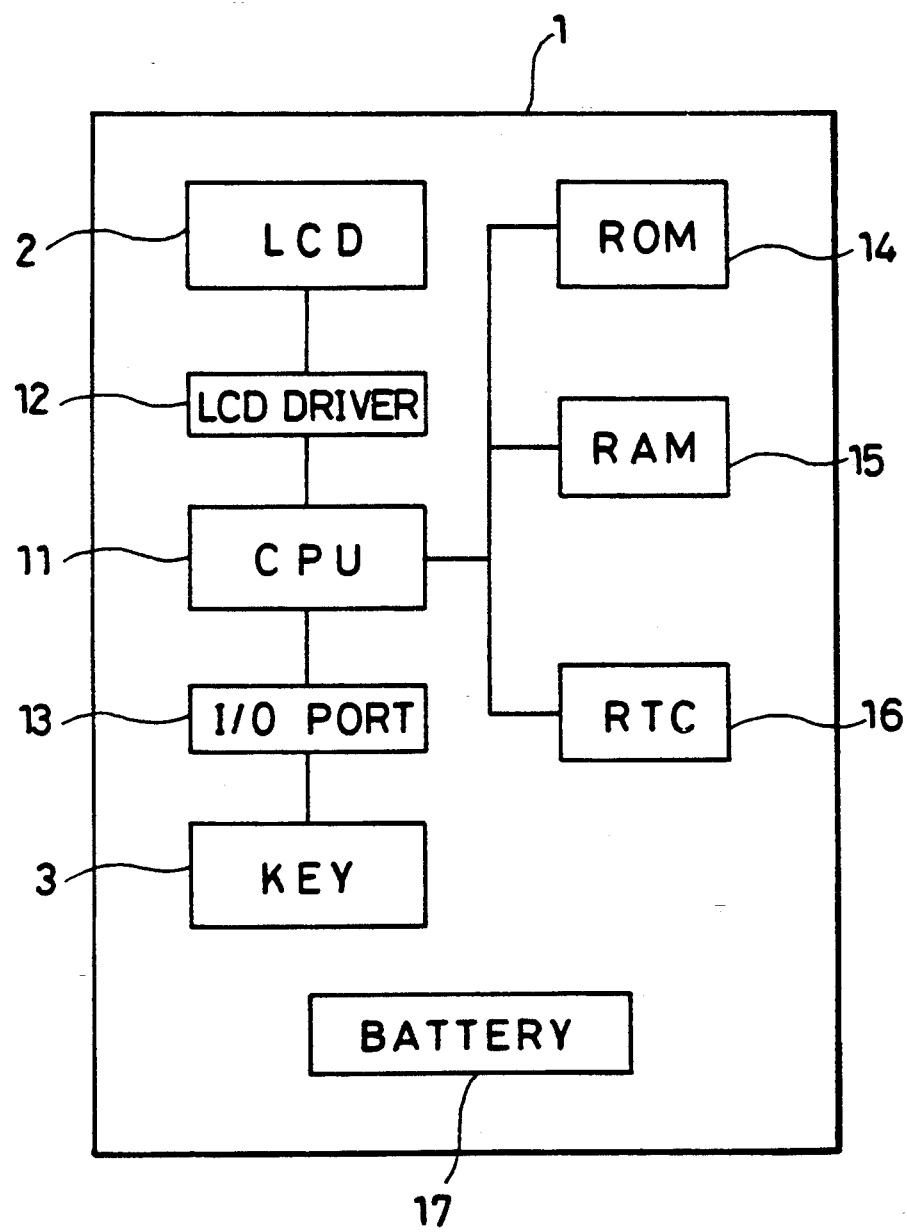

The main body 1 of the apparatus incorporates a control unit shown in FIG. 4. The control unit includes: a central processing unit 11 (hereinafter referred to as the CPU) for executing an input/output processing, an arithmetic processing and the like for the entire apparatus; an LCD driver 12 for driving an LCD 2 based on a control signal supplied from the CPU 11; an input/output port 13 (hereinafter referred to as the I/O port) for transmitting data entered through the input key group 3, to the CPU 11; a ROM 14 for storing a control program of the CPU 11, mainly an input/output control program, and for serving as a data unit for storing a number of data; a RAM 15 for temporarily storing data utilized in the control program of the ROM 14; and a real time clock 16 (hereinafter referred to as the RTC) for clocking hour, minute and second to count the date.

The ROM 14 is a read-only memory and contains a variety of data for the modes to be respectively selected with the input keys of the mode setting key group 4. For example, in the English-English dictionary mode, the ROM 14 contains the meaning data and the like of index words based on which a search is made. The RAM 15 is a read/write random-access memory. The RTC 16 is adapted such that the contents are read or written by the CPU 11.

Further, the apparatus includes batteries 17 as a power supply. Provision is made such that, even though the power is turned OFF, the batteries 17 are operated to back up the RAM 15 such that the contents stored therein are maintained.

The processing unit includes the CPU 11, the ROM 14, the RAM 15 and the LCD driver 12. The ROM 14 includes a data unit containing index words, their meanings and the like, an index unit to be used for a search, and a program unit containing an operation program.

Figure 5:
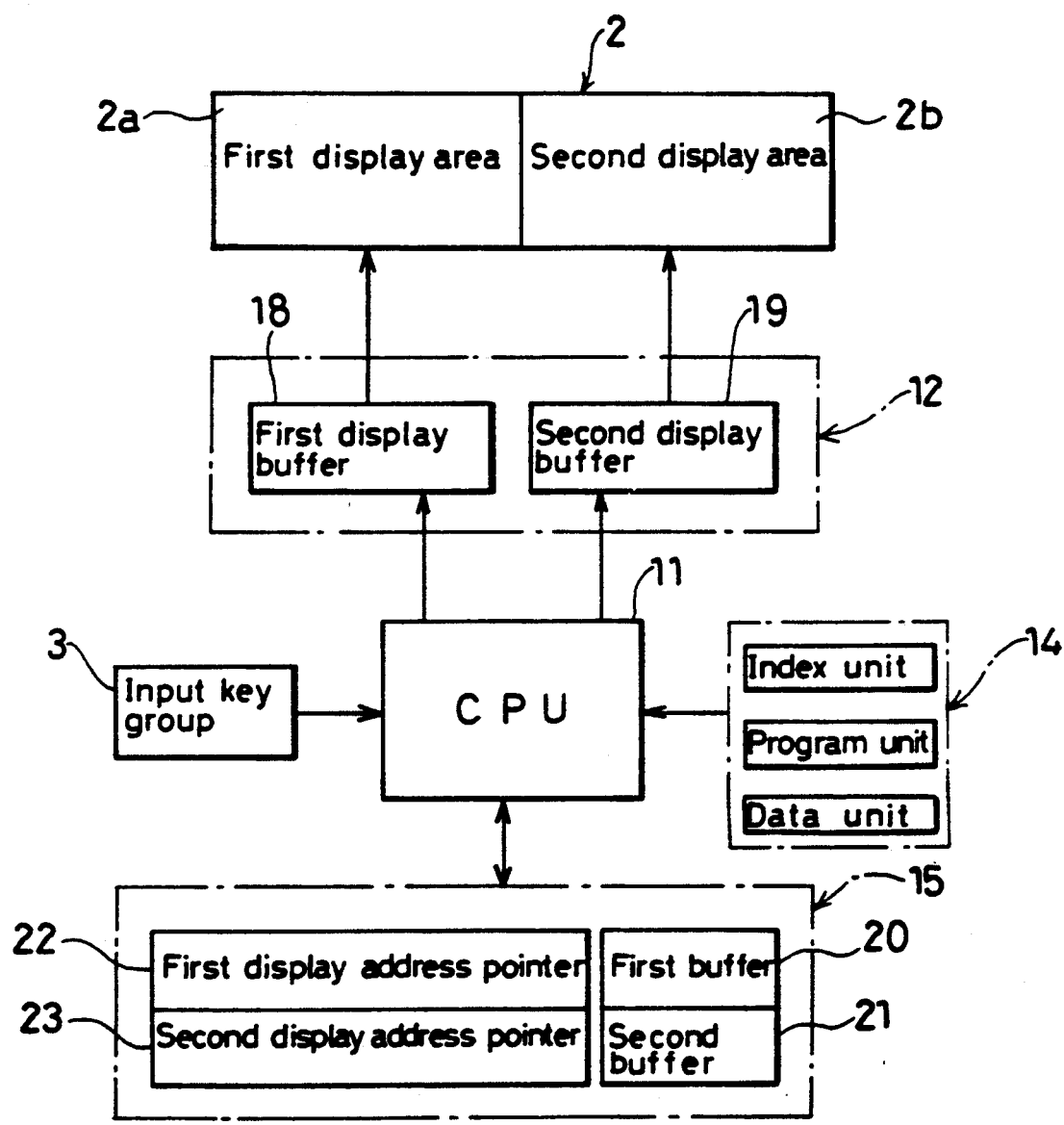

FIG. 5 shows the arrangement embodying the schematic arrangement of the control unit shown in FIG. 4.

The LCD driver 12 includes a first display buffer 18, and a second display buffer 19. The first display buffer 18 corresponds to a first display area 2a forming the upper-half portion of the screen of the LCD 2, while the second display buffer 19 corresponds to a second display area 2b forming the lower-half portion of the screen of the LCD 2.

The RAM 15 includes a first buffer 20, a second buffer 21, a first display address pointer 22, and a second display address pointer 23. The display address pointers 22, 23 are adapted to indicate the addresses on the first and second buffers 20, 21. The first display address pointer 22 is used as an index word buffer address pointer, while the second display address pointer 23 is used as a meaning buffer address pointer.

The information display apparatus having the arrangement above-mentioned is so arranged as to execute a variety of functions in the manner that, based on the operation program in the ROM 14, the CPU 11 executes a processing according to data entered through the input key group 3, and the LCD 2 displays the results of this processing.

Figure 1:
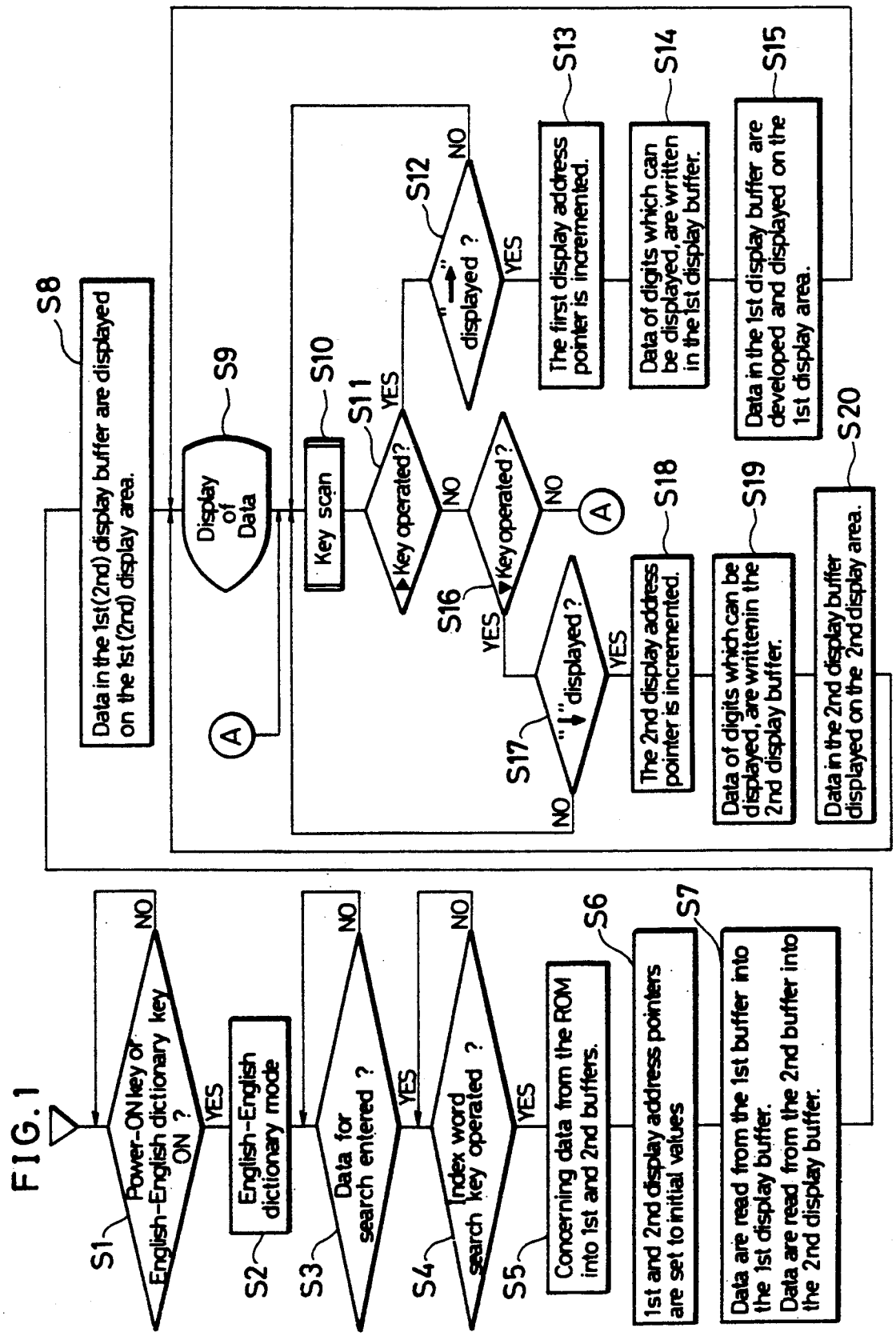

The following description will discuss the operation of the information display apparatus with reference to the flowchart shown in FIG. 1 based on examples of display in FIGS. 6(a) to (e).

The following description is made of an operation of scrolling displayed data when the English-English dictionary mode is selected.

For setting the mode to the English-English dictionary mode, the English-English dictionary key 4a of the mode setting key group 4 or the power-ON key 7 is operated (S1).

Figure 6A:
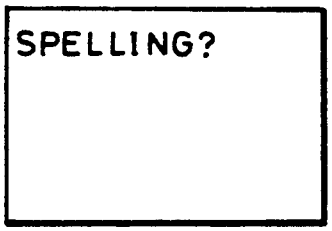
FIGS. 6(a) to (e) are views illustrating examples of display in a liquid crystal display device.

Thus, the operation mode is set to the English-English dictionary mode and the sequence enters in processing of the English-English dictionary application software (S2). At this time, the LCD 2 displays an initial screen as shown in FIG. 6(a) and the sequence is in a state waiting for entry of the spelling of a word desired to be searched.

Figure 6B:
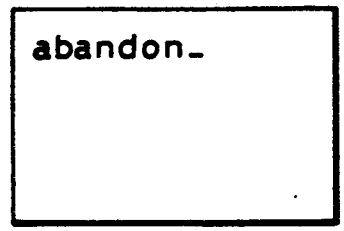

It is now supposed that an index word "abandon" is to be searched. In this case, data for search are entered by operating the alphabetical keys of the alphabet key group 5 and the numerical keys of the numeral input key group 6 (S3). Then, "abandon_" is displayed on the LCD 2 display screen as shown in FIG. 6(b).

Next, the index word search key 9a of the operation key group 9 is operated (S4).

Figure 7:
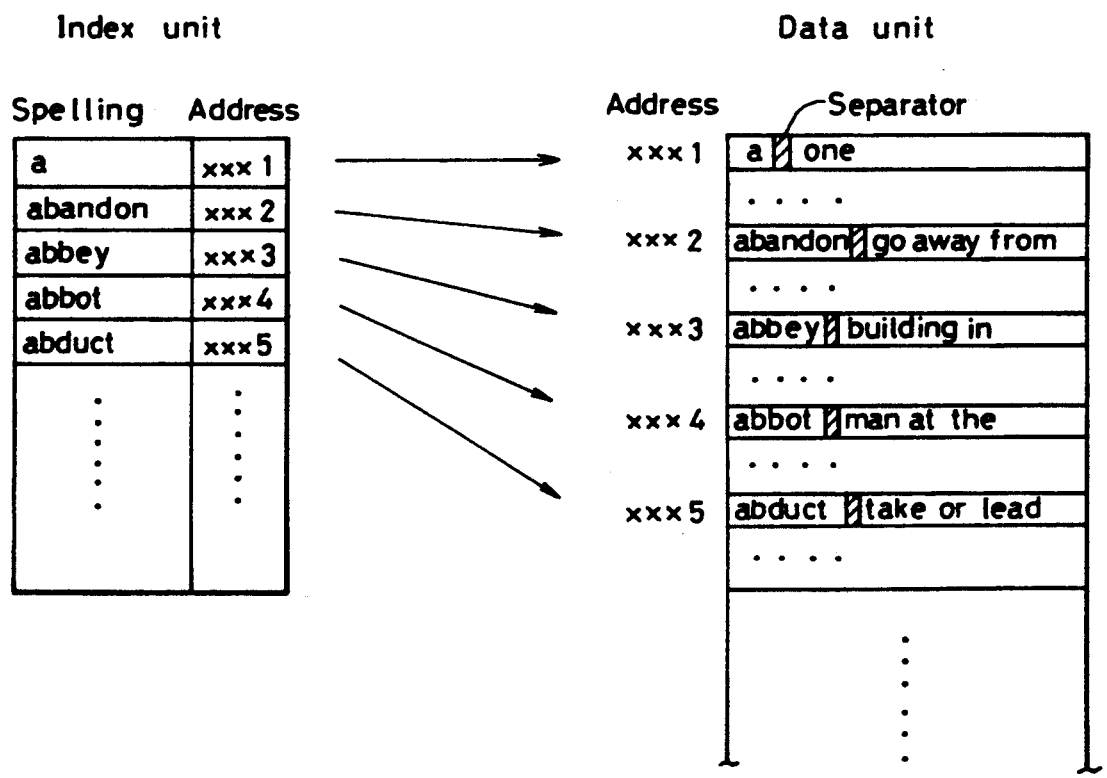

When the index word search key 9a is operated, the index word search key processing is started. More specifically, based on the operation program stored in the ROM 14, the CPU 11 obtains the record corresponding to the entered spelling "abandon", from the index unit as shown in FIG. 7. Then, the CPU 11 obtains, based on the address of this record, the record concerned in the data unit in FIG. 7, and calls the index word and meaning data in this data record, to the first and second buffers 20, 21 of the RAM 15 (S5).

The first and second display address pointer 22, 23 are set to the initial values, respectively (S6).

Based on the address indicated by the first display address pointer 22, data of digits which can be displayed at one time on the first display area 2a of the LCD 2, are read from the first buffer 20 and written in the first display buffer 18 (S7). At the same time, based on the address indicated by the second address pointer 23, data of digits which can be displayed at one time on the second display area 2b, are read from the second buffer 21 and written in the second display buffer 19 (S7).

Figure 6C:
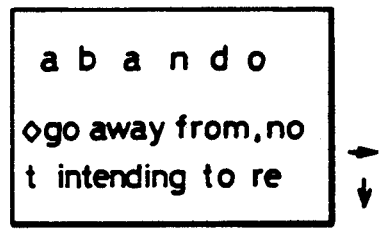

The data in the first display buffer 18 are developed in the first display area 2a of the LCD 2, and the data in the second display buffer 19 are developed in the second display area 2b (S8). Such data as developed are displayed (S9). At this time, the index word is displayed at the upper part corresponding to the first display area 2a, and the meaning is displayed at the lower part corresponding to the second display area 2b, as shown in FIG. 6(c). In this state, there are not entirely displayed (i) the data to be displayed on the first display area 2a, i.e., the index word "abandon", and (ii) the data to be displayed on the second display area 2b, i.e., the meaning of "abandon". Accordingly, there are displayed "→" and " ↓ " presenting that more data to be displayed are present.

Here, it is scanned which key of the cursor key group 10 or other group has been operated (S10).

When the right-direction cursor key 10a is operated to display, on the LCD 2, a portion of the index word which is not currently displayed thereon (S11), it is judged whether or not there are present more data for the index word which cannot be displayed at one time on the first display area 2a, i.e., whether or not "→" is displayed (S12). In this example, "→" is displayed as shown in FIG. 6(c). Accordingly, there is made an operation for scrolling the displayed data in the left direction.

That is, the first display address pointer 22 for index word is incremented (S13), and, based on the address indicated by the address pointer 22, data of digits which can be displayed at one time on the first display area 2a, are read from the first buffer 20 and written in the first display buffer 18 (S14).

Figure 6D:
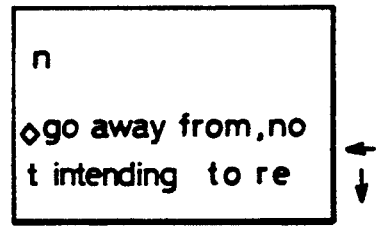

Then, the data of the first display buffer 18 are developed (S15) and displayed (S9) on the first display area 2a. The portion of the index word which could not be displayed at one time, i.e., "n", is now displayed at the upper part of the LCD 2 screen as shown in FIG. 6(d). At this time, the data displayed on the second display area 2b at the lower part of the LCD 2 screen are not scrolled but remain immobile.

In this state, when the down-direction cursor key 10c is operated (S16), it is judged whether or not there are present more data for the meaning data which cannot be displayed at one time on the second display area 2b, i.e., whether or not " ↓ " is displayed (S17). In this example, since " ↓ " is displayed, there is made an operation for scrolling the displayed data upward.

That is, the second display address pointer 23 for meaning data is incremented (S18), and, based on the address indicated by the address pointer 23, data of digits which can be displayed at one time on the second display area 2b, are read from the second buffer 21 and written in the second display buffer 19 (S19).

Figure 6E:
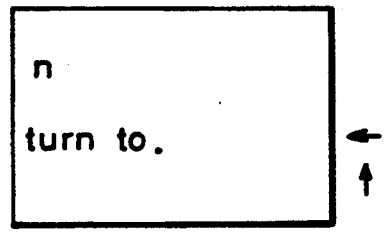

Next, the data of the second display buffer 19 are developed (S20) and displayed (S9) on the second display area 2b. At this time, there is displayed the portion of the meaning of the index word which could not be displayed at one time, i.e., "turn to.", as shown in FIG. 6(e). At this time, the data displayed on the first display area 2a at the upper part of the LCD 2 screen are not scrolled but remain immobile.

When the left-direction cursor key 10b or the updirection cursor key 10d is operated, it is then judged, in the same manner as above-mentioned, whether or not "←" or " ↑ " is displayed. Then, the first display address pointer 22 or the second display address pointer 23 is decremented. Based on the address indicated by the pointer 22 or 23, data of digits which can be displayed at one time on the first display area 2a or the second display area 2b, are read from the first buffer 20 or the second buffer 21, and written in the first display buffer 18 or the second display buffer 19. The data are then developed in the first display area 2a or the second display area 2b, and displayed on the LCD 2. Thus, the data displayed on the first display area 2a may be scrolled in the right direction, or the data displayed on the second display area 2b may be scrolled in the down direction.

As described in the foregoing, the index word displayed on the first display area 2a of the LCD 2 may be independently scrolled leftward or rightward by operating the right-direction cursor key 10a or the left-direction cursor key 10b. The meaning data of the index word displayed on the second display area 2b may be independently scrolled upward or downward by operating the up-direction cursor key 10d or the down-direction cursor key 10c. Accordingly, by operating the cursor key group 10, the index word and its meaning data may be independently scrolled, in the individual directions, on the first display area 2a and the second display area 2b, respectively. Thus, the data portion which cannot be displayed at one time on the LCD 2, may be readily displayed.

In the embodiment above-mentioned, the description has been made of the function of scrolling data in an individual direction for every display area. However, there may be also described, in the same manner, a function of scrolling data displayed on the display unit in an individual direction for every by-group data (Such description is here omitted). For example, data may be grouped according to the sizes of fonts of characters, or according to data types such as index words, meanings and the like.

The following description will discuss the automatic power-off function.

The main body 1 of the apparatus incorporates the control unit shown in FIG. 4. This control unit is so arranged as to execute an input/output processing, an arithmetic processing and the like for the entire information display apparatus. Further, the control unit is so arranged as to execute (i) the automatic power-off function for automatically turning the power of the apparatus to OFF if the apparatus remains non-operated for a predetermined period of time, and (ii) a continuous search function for continuously displaying, in a predetermined order, data concerned as selected from previously stored data with entered data serving as a clue. Further, the control unit is arranged such that, when a predetermined amount of continuous search is finished, search stop means automatically stops such continuous search under way, thereby to make effective the automatic power-off function.

Figure 8:
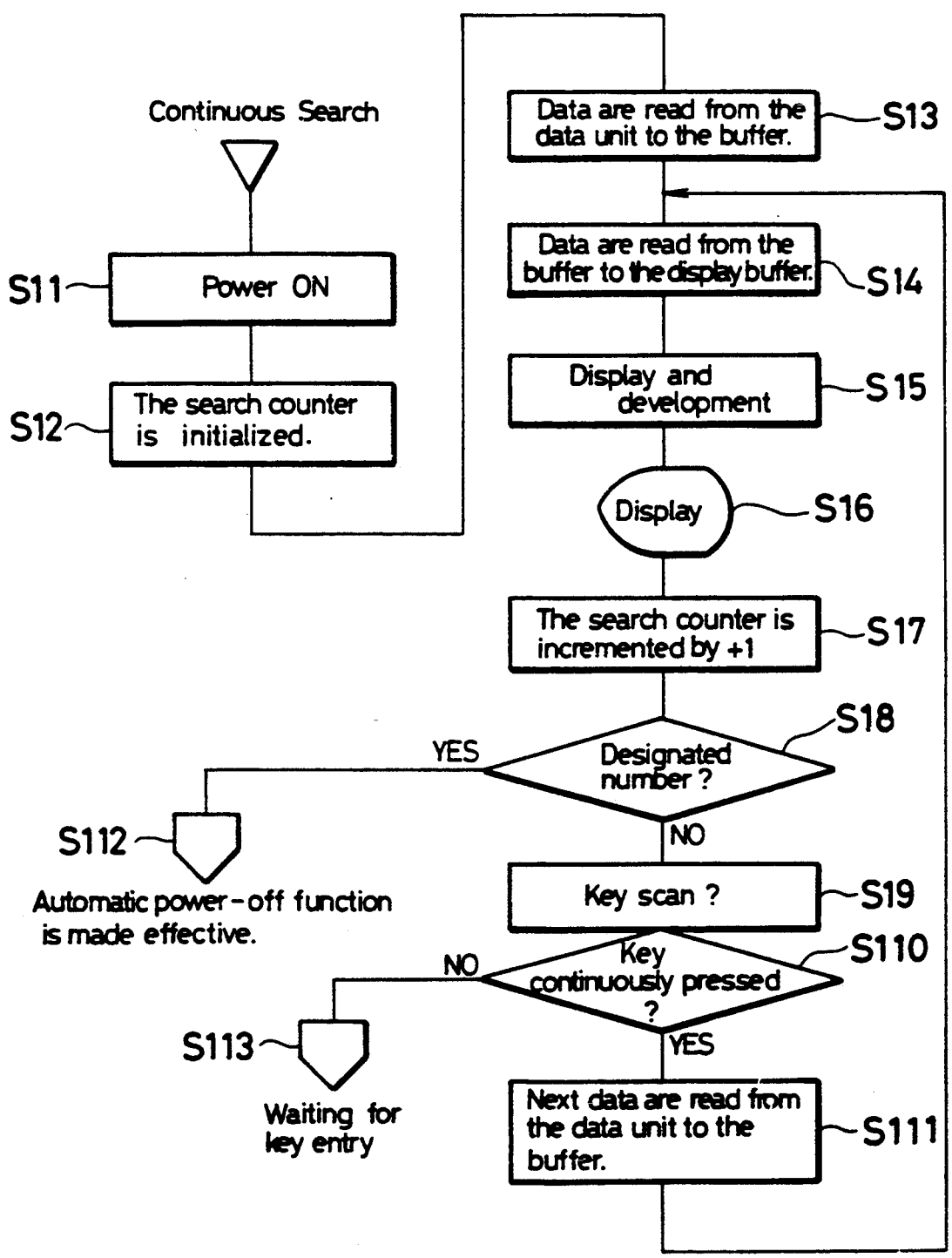

The following description will discuss the operation of the apparatus with reference to a flowchart in FIG. 8.

In this example, the English-English dictionary mode is to be selected. That is, the English-English dictionary key 4a of the mode setting key group 4 or the power-ON key 7 is operated to set the operation mode to the English-English dictionary mode. Thus, the sequence enters into a processing of an English-English dictionary application software (S11). At this time, the LCD 2 displays an initial screen as shown in FIG. 6(a).

Then, when a sequential feed key 9c of the operation key group 9 is operated, a continuous search processing is executed. A search counter (not shown) in the CPU 11 is initially set (S12).

It is now supposed that a search is made based on an index word "abandon" (input data to be searched). First, keys of the alphabet key group 5 and numeral keys of the numeral input key group 6 are operated to enter data for search in alphabets. Then, "abandon" is displayed on the display screen of the LCD 2 as shown in FIG. 6(b).

Then, the sequential feed key 9c of the operation key group 9 is to be operated. When the sequential feed key 9c is pressed, a continuous search processing is started based on the entered data. Based on the operation program stored in the ROM 14, the CPU 11 obtains the record corresponding to the entered data, i.e., "abandon", from the index unit as shown in FIG. 7. Based on the address of this record, the CPU 11 obtains the record concerned in the data unit in FIG. 7. Then, the CPU 11 calls the index word and meaning data in this data record, into the first and second buffers 20, 21 of the RAM 15 (S13).

Based on the address indicated by the display address pointer 21, data concerned by a predetermined unit are read from the first and second buffers 20, 21 and written in the first and second display buffers 18, 19 (S14). These data concerned are developed in the LCD driver 12 (S15), and displayed on the display screen of the LCD 2 (S16). At this time, the data concerned, i.e., "abandon" are displayed as shown in FIG. 6(c). Then, the search counter is incremented by +1 (S17).

It is then judged whether or not the number of counts is identical with the preset designated number (S18). If not, it is then judged in a key scanning operation (S19) whether or not the sequential feed key 9c has been pressed (S110).

When the sequential feed key 9c has not been pressed, the sequence proceeds to a state waiting for key entry (S113).

When the sequential feed key 9c remains pressed, the index unit pointer is incremented to obtain the next record from the index unit of the ROM 14 as shown in FIG. 7. Then, there is obtained the next data record in the data unit in FIG. 7 stored in the address of this record. The next data record thus obtained is called to the first and second buffers 20, 21 of the RAM 15 (S111).

Thereafter, the sequence is returned to the step 14, and the operations from the step 14 to the step 111 are repeated. When these operations are repeated, the number of counts of the search counter is increased. When it is judged at the step 18 that the number of counts is identical with the preset designated number, the continuous search processing is stopped to make effective the automatic power-off function (S112).

Figure 9:
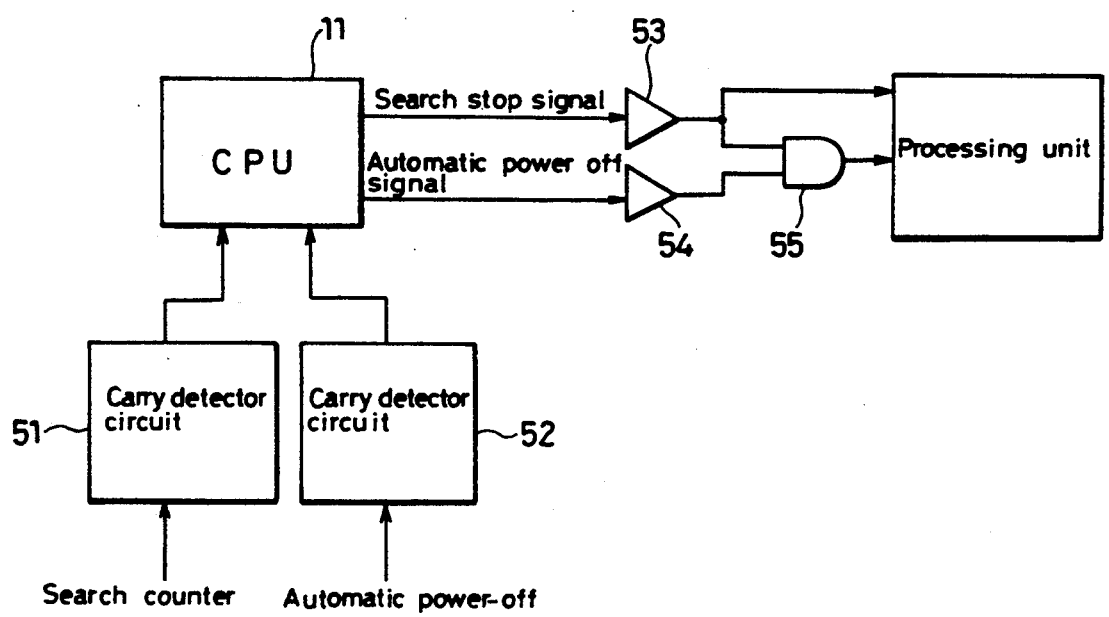

The following description will discuss the automatic power-off operation with reference to FIG. 9.

At the step 18, when the number of counts of the search counter is identical with the preset designated number, the search counter produces a carry. When the carry is entered into a carry detector circuit 51, this circuit 51 is in a high level in a binary logic. When a high-level output of the circuit 51 is entered into the CPU 11, the CPU 11 supplies, through a buffer circuit 53, a search stop signal to the processing unit and to one input terminal of an AND circuit 55 for executing a logical product operation. This causes the control unit to stop the search processing.

In this state, when, at the step 18, the number of counts of the automatic power-off counter is identical with the preset designated number, the automatic power-off counter produces a carry. When the carry is entered into a carry detector circuit 52, the circuit 52 is in a high level in a binary logic. When a high-level output of the circuit 52 is entered into the CPU 11, the CPU 11 supplies an automatic power-off signal to the other input terminal of the AND circuit 55 through a buffer circuit 54. The automatic power-off counter is adapted to monitor the non-operation state of the information display apparatus, and to execute a counting operation while the apparatus is under non-operation.

As described in the foregoing, since both input terminals of the AND circuit 55 are in a high level, the circuit 55 supplies a high-level output to the processing unit. With such operation, the control unit executes the automatic power-off operation.

When the search counter produces no carry, the output of the carry detector circuit 51 is in a low level. Accordingly, the output of the buffer circuit 53 is also in a low level so that a normal search operation is executed. At this time, since the output of the AND circuit 55 is also in a low level, the automatic power-off operation is not executed.

Alternately, the main body 1 of the apparatus may incorporates a timer adapted such that the continuous search processing is stopped when the CPU 11 judges that the search processing time exceeds a predetermined period of time.

According to the arrangement above-mentioned, if the amount of data concerned corresponding to input data is considerable, the continuous search processing is stopped after it has been made to a certain extent. Thereafter, the automatic power-off function is made effective, preventing the continuous search operation from being executed in vain for a long period of time. This prevents the increase in power consumption.

As thus described, the information display apparatus in accordance with the present invention comprises:
  an input unit for entering a variety of data and for designating a variety of processings;
  a display unit for displaying input data and processing results;
  a processing unit having (i) a scrolling function for scrolling data displayed on the display unit in an individual direction for every display data or for every displayed data of each of a plurality of groups according to designation made at the input unit, (ii) a continuous search function for continuously searching, in a predetermined order, data concerned with entered data serving as a clue, and (iii) an automatic power-off function for automatically turning the power of the apparatus to OFF if the apparatus remains non-operated for a predetermined period of time; and search stop means adapted to automatically stop a continuous search under way when a predetermined amount of continous search is finished, thereby to make effective the automatic power-off function.

The information display apparatus in accordance with the present invention comprises:

a display unit for displaying data;

a plurality of input units for designating the directions in which data displayed on the display unit are to be scrolled; and a processing unit for displaying data with the display unit divided into a plurality of display areas, and for scrolling data displayed on the display areas in an individual direction for every display area according to designation made at each of the input units.

When it is desired to see portions of data which cannot be displayed at one time on the respective display areas of the display unit, the displayed data may be respectively scrolled in an individual direction for every display area by operating each of the input units. Thus, such data portions may be displayed on the display unit. This enables, for example, different data to be readily referred to without troublesome operations such as separate edition and display and the like. This not only considerably improves the maneuverability, but also enables respective data to be efficiently displayed with the improved visuality.

The input units may include an input key group for entering a variety of informations, and a cursor key group for moving the screen and the cursor in predetermined directions.

The input key group may include a mode setting key group for calling and setting a variety of functions of the information display apparatus.

The mode setting key group may include an English-English dictionary key for setting an English-English dictionary mode, and other keys for respectively setting modes of calender, schedule, calculation, telephone No., memo and the like.

The cursor key group may include a key for moving the cursor rightward, a key for moving the cursor leftward, a key for moving the cursor upward, and a key for moving the cursor downward.

The processing unit may include a central processing unit, a read-only memory, a read/write random-access memory and a liquid crystal display device driver.

The information display apparatus above-mentioned may include batteries for backing up data temporarily stored in the processing section, even though the power of the apparatus is turned to OFF.

The liquid crystal display device driver may include a first display buffer forming the upper-half portion of the screen of a liquid crystal display device, and a second display buffer forming the lower-half portion of the screen of the liquid crystal display device.

The read/write random-access memory may include an index word buffer, an index word buffer address pointer, a meaning buffer, and a meaning buffer address pointer.

The display unit may include a liquid crystal display device.

The liquid crystal display device may include a display of the dot matrix type.

The liquid crystal display device may include a plurality of display areas.

The liquid crystal display device may include a first display area corresponding to the upper-half portion of the liquid crystal display device, and a second display area corresponding to the lower-half portion thereof.

The information display apparatus in accordance with the present invention comprises:

a display unit for displaying data:

a plurality of input units for designating the directions in which data displayed on the display unit are to be scrolled; and a processing section for displaying data of a plurality of groups on the display unit and for scrolling data of a plurality of groups displayed on the display unit in an individual direction for every data group.

When it is desired to see portions of data of the respective groups which cannot be displayed at one time on the display unit, the displayed data may be respectively scrolled in individual directions by operating the respective input units. Thus, such data portions may be displayed on the display unit. This eliminates the operations for separately editing and displaying data of different groups and for successively scrolling such data. This not only considerably improves the maneuverability, but also assures an efficient data display. Thus, the data may be readily referred to.

The input units may include an input key group for entering a variety of informations, and a cursor key group for moving the screen and the cursor in predetermined directions.

The input key group may include a mode setting key group for calling and setting a variety of functions of the information display apparatus.

The mode setting key group may include an English-English dictionary key for setting an English-English dictionary mode, and other keys for respectively setting modes of calender, schedule, calculation, telephone No., memo and the like.

The cursor key group may include a key for moving the cursor rightward, a key for moving the cursor leftward, a key for moving the cursor upward, and a key for moving the cursor downward.

The processing unit may include a central processing unit, a read-only memory, a read/write random-access memory and a liquid crystal display device driver.

The information display apparatus above-mentioned may include batteries for backing up data temporarily stored in the processing unit, even though the power of the apparatus is turned to OFF.

The liquid crystal display device driver may include a first display buffer forming the upper-half portion of the screen of a liquid crystal display device, and a second display buffer forming the lower-half portion of the screen of the liquid crystal display device.

The read/write random-access memory may include an index word buffer, an index word buffer address pointer, a meaning buffer, and a meaning buffer address pointer.

The display unit may include a liquid crystal display device.

The liquid crystal display device may include a display of the dot matrix type.

The liquid crystal display device may include a first display area corresponding to the upper-half portion of the liquid crystal display device, and a second display area corresponding to the lower-half portion.

The information display apparatus in accordance with the present invention comprises:
  an input unit for entering a variety of data and for designating a variety of processings;
  a display unit for displaying input data and processing results;
  a memory unit for storing input data and a variety of information;
  a control circuit for controlling all the units above-mentioned; and
  search stop means adapted to automatically stop a continuous search under way when a predetermined amount of continous search is finished, thereby to make effective an automatic power-off function by which the power of the apparatus is turned to OFF if the apparatus remains non-operated for a predetermined period of time;
  whereby the apparatus is capable of executing a continuous search for continuously displaying, in a predetermined order, data concerned as selected out of previously stored data with entered data serving as a clue.

Accordingly, it is prevented that a continuous search operation is executed in vain for a long period of time. This results in reduction in power consumption.

The information display apparatus above-mentioned may comprise a control unit including: a central processing unit for executing an input/output processing and an arithmetic processing for the entire apparatus; a liquid crystal display device driver for driving a liquid crystal display device; input/output ports; a read-only memory; a read/write random-access memory; and a real time clock for counting the date.

The search stop means may include a timer for counting a search time, adapted to stop a continuous search processing when the search time thus counted exceeds a predetermined period of time.

The search stop means may include a search counter for detecting a predetermined amount of continuous serch, an automatic power-off counter for detecting a state where the information display apparatus remains non-operated for a predetermined period of time, carry detector circuits for detecting carries of the counters above-mentioned, and a logic circuit for judging the automatic power-off operation.

The display unit may include a liquid crystal display device.

The liquid crystal display device may include a display of the dot matrix type.

The display unit may include a first display area corresponding to the upper-half portion of the liquid crystal display device, and a second display area corresponding to the lower-half portion thereof.

The information display apparatus above-mentioned may include batteries for backing up data temporarily stored in the control unit, even though the power of the apparatus is turned to OFF.

The liquid crystal display device driver may include a display buffer for temporarily storing displayed data.

The read/write random-access memory may include an index word buffer, an index word buffer address pointer, a meaning buffer, and a meaning buffer address pointer.

The liquid crystal display device may include a first display area corresponding to the upper-half portion of the liquid crystal display device, and a second display area corresponding to the lower-half portion thereof.

A method of scrolling displayed data in an information display apparatus in accordance with the present invention may comprise the steps of:
  entering data for search through an input unit;
  reading data concerned from a read-only memory and displaying such data on a display unit; and
  scrolling displayed data in an individual direction for every display area or for every displayed data according to designation made at an input unit.

The invention being thus described, it will be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. An information display apparatus comprising:
  an input unit for entering a variety of data and for designating a variety of processings;
  a display unit for displaying input data and processing results, said display unit comprising a screen and a cursor disposed on said screen, said display unit being divided into a plurality of display areas;
  a processing unit having (i) a scrolling function for scrolling data displayed on said display unit in an individual direction for every displayed data or for every displayed data of each of a plurality of groups according to designation made at said input unit, (ii) a continuous search function for continuously searching, in a predetermined order, data concerned with entered data serving as a clue, (iii) an automatic power-off function for automatically turning the power of said apparatus to OFF if said apparatus remains non-operated for a predetermined period of time, and (iv) processing means for displaying symbols on said display areas, said symbols indicating data records displayed are a part of data to be displayed and a scrolling direction of data records for each display area; and
  search stop means adapted to automatically stop a continuous search under way when a predetermined plurality of continuous search functions are completed, thereby to make effective said automatic power-off function;
  said automatic power-off function further responding to said automatic stop of said search stop means.

2. An information display apparatus as set forth in claim 1, wherein the input unit includes an input key group for entering a variety of information, and a cursor key group for moving the screen and the cursor in predetermined directions.

3. An information display apparatus as set forth in claim 2, wherein the input key group includes a mode setting key group for calling and setting a variety of functions of said information display apparatus.

4. An information display apparatus as set forth in claim 3, wherein the mode setting key group includes an English-English dictionary key for setting an English-English dictionary mode, and other keys for respectively setting modes of calender, schedule, calculation, telephone No., memo and the like.

5. An information display apparatus as set forth in claim 2, wherein the cursor key group includes a key for moving the cursor rightward, a key for moving the cursor leftward, a key for moving the cursor upward, and a key for moving the cursor downward.

6. An information display apparatus as set forth in claim 1, wherein the processing unit includes a central processing unit, a read-only memory, a read/write random-access memory and a liquid crystal display device driver.

7. An information display apparatus as set forth in claim 1, further comprising batteries for backing up data temporarily stored in the processing unit, even though the power of said apparatus is turned to OFF.

8. An information display apparatus as set forth in claim 6, wherein said liquid crystal display device driver includes a first display buffer connected to the upper-half portion of the screen of a liquid crystal display device, and a second display buffer connected to the lower-half portion of the screen of said liquid crystal display device.

9. An information display apparatus as set forth in claim 6, wherein the read/write random-access memory includes an index word buffer, an index word buffer address pointer, a meaning buffer, and a meaning buffer address pointer.

10. An information display apparatus as set forth in claim 1, wherein the display unit includes a liquid crystal display device.

11. An information display apparatus as set forth in claim 10, wherein the liquid crystal display device includes a display of the dot matrix type.

12. An information display apparatus as set forth in claim 10, wherein the liquid crystal display device includes a plurality of display areas.

13. An information display apparatus as set forth in claim 10, wherein the liquid crystal display device includes a first display area corresponding to the upper-half portion of said liquid crystal display device, and a second display area corresponding to the lower-half portion thereof.

14. An information display apparatus comprising:
an input unit for entering a variety of data and for designating a variety of processings;
a display unit for displaying input data and processing results;
a memory unit for storing input data and a variety of information;
a control circuit for controlling all said units; and
search stop means adapted to automatically stop a continuous search under way when a predetermined plurality of continuous search functions are completed, thereby to make effective an automatic power-off function which turns the power of said apparatus to OFF if said apparatus remains non-operated for a predetermined period of time;
whereby said apparatus is capable of executing a continuous search function for continuously displaying, in a predetermined order, data concerned as selected out of previously stored data with entered data serving as a clue.

15. An information display apparatus as set forth in claim 14, further comprising a control unit including: a central processing unit for executing an input/output processing and an arithmetic processing for said apparatus; a liquid crystal display device driver for driving a liquid crystal display device; an input/output port; a read-only memory; a read/write random-access memory; and a real time clock for counting the date.

16. An information display apparatus as set forth in claim 15, wherein the search stop means includes a timer for counting a search time, adapted to stop a continuous search processing when the search time counted by said timer exceeds a predetermined period of time.

17. An information display apparatus as set forth in claim 16, wherein the search stop means includes a search counter for detecting a predetermined amount of continuous search, an automatic power-off counter for detecting a state where said apparatus remains non-operated for a predetermined period of time, carry detector circuits for respectively detecting carries of said counters, and a logic circuit for receiving said carries of said counters from said carry detector circuits to judge an automatic power-off operation.

18. An information display apparatus as set forth in claim 14, wherein the display unit includes a liquid crystal display device.

19. An information display apparatus as set forth in claim 18, wherein the liquid crystal display device includes a display of the dot matrix type.

20. An information display apparatus as set forth in claim 18, wherein the display unit includes a first display area corresponding to the upper-half portion of the liquid crystal display device, and a second display area corresponding to the lower-half portion thereof.

21. An information display apparatus as set forth in claim 15, further comprising batteries for backing up data temporarily stored in the control unit, even though the power of said apparatus is turned to OFF.

22. An information display apparatus as set forth in claim 15, wherein the liquid crystal display device driver includes a display buffer for temporarily storing displayed data.

23. An information display apparatus as set forth in claim 15, wherein the read/write random-access memory includes an index word buffer, an index word buffer address pointer, a meaning buffer, and a meaning buffer address pointer.

24. An information display apparatus as set forth in claim 18, wherein the liquid crystal display device includes a first display area corresponding to the upper-half portion of said liquid crystal display apparatus, and a second display area corresponding to the lower-half portion thereof.

25. An information display apparatus comprising:
data input means for entering a variety of data;
memory means for predeterminately storing a group of data;
search designation input means for designating search data associated with data entered by said data input means to be searched among said group of data stored in said memory means;
processing means for executing a searching operation among said group of data stored in said memory means according to the designation of said search designation input means;
a first counter for counting the number of consecutive search operations designated by the search designation input means;
first detecting means for releasing a first signal when said first counter reaches a predetermined plurality of counts; and
first controlling means for receiving said first signal from said first detecting means and stopping said searching operation by said processing means upon receipt of said first signal.

26. The apparatus of claim 25 further comprising:
a second counter for measuring a period of non-operation time of the search designation input means;
second detecting means for releasing a second signal when said second counter reaches a predetermined value; and
second controlling means for receiving said first and second signals and automatically switching off said apparatus upon receipt of said first and second signals.

27. The apparatus of claim 25 further comprising:
a second counter for measuring a period of operation time of the search designation input means when said search designation input means is consecutively operated;
second detecting means for releasing a second signal when said second counter reaches a predetermined plurality of counts; and
second controlling means for receiving said first and second signals and automatically switching off said apparatus upon receipt of said first and second signals.

28. An information display apparatus for displaying data stored in discrete records comprising:
data input means for entering a variety of data;
memory means for predeterminately storing a group of data in discrete records;
display means including a plurality of display areas which are divided depending on contents of display data records, each display area having a predetermined different scrolling direction from each other;
a plurality of scrolling direction designating means, wherein each designating means designates a scrolling direction of data records displayed on said display areas, and further wherein each designating means corresponds in an operative relationship to one of said display areas;
first processing means for receiving scrolling directions designated by said designating means and scrolling the data record displayed in the display area corresponding in an operative relationship to each said designating means in each designated scrolling direction;
search designation input means for designating search data associated with data entered by said data input means to be searched among said group of data stored in said memory means;
second processing means for executing a searching operation among said group of data stored in said memory means upon the designation of said search designation input means;
a first counter for counting the number of consecutive search operations designated through the search designation input means;
first detecting means for releasing a first signal when said first counter reaches a predetermined plurality of counts; and
first controlling means for receiving said first signal from said first detecting means and stopping said searching operation by said processing means upon receipt of said first signal.

* * * * *